United States Patent Office 3,320,853
Patented May 23, 1967

3,320,853
MICROFILM FLOW TYPE CAMERA FOR MAKING TWO REPRODUCTIONS FROM ONE OBJECT
Herbert Froese, Berlin, Germany, assignor, by mesne assignments, to Agfa-Gevaert Aktiengesellschaft, Leverkusen, Germany, a corporation of Germany
Filed Mar. 24, 1965, Ser. No. 442,348
5 Claims. (Cl. 88—24)

This invention relates generally to microfilm flow type cameras.

More specifically, this invention relates to a microfilm flow type camera of novel construction in which a sheet, of which only one or both sides are to be reproduced, is operatively moved to the light path of lighting means, wherefrom the light is guided through optical reduction means onto a light sensitive film which moves at a synchronous but reduced speed through the camera.

It is a general object of this novel microfilm flow type camera to provide means for making two identical reproductions of the same object (sheet). The sheet may require reproductions of one or both sides.

It is another object of this invention to provide an improved microfilm flow type camera which can make two reproductions of unequal size of the same object (sheet).

In the known microfilm flow type cameras the sheet which is to be reproduced is transported by belt and roller means through the light path of one or more lamps which illuminate the sheet. The light is guided to an objective lens in a different plane from the sheet via a plurality of mirrors each of which has a silver coated surface. The light then travels through the objective lens and thence through a slit arranged behind the objective lens and finally impinges on a light sensitive film which travels at a synchronous speed, which is reduced by the reduction factor of the objective lens, i.e. the reduction factor of the sheet to the film.

The known types of microfilm flow type cameras are only suitable for exposing one sole film belt. Some of these known types of cameras are also provided with an arrangement of mirrors for guiding the images of the front and back sides of a sheet simultaneously on a light sensitive film in a side by side arrangement. However, these known types of microfilm flow type cameras can not take simultaneusly two identical pictures of the same side of a sheet. A special installation, as described below, is required for this purpose in the known cameras.

This known installation comprises generally an arrangement of three identical objective lenses in side by side fashion. Two film belts are movably arranged in the camera behind these lenses and are provided with drive means so as to move jointly. The light beams traversing the lenses partially overlap each other. The aforedescribed installation is cumbersome, complex and costly to install. It requires three identical lenses which must be installed with a small tolerance exactness, which is a costly and easily malfunctioning arrangement.

It is, therefore, a specific object of this invention to provide a novel microfilm flow type camera which includes inexpensive means for taking two pictures of the same side of a sheet simultaneously.

The device of this invention comprises two cameras and two mirrors. The latter are arranged one behind the other and at an angle of 90° with respect to each other. The sheet transport belt means in the camera travel in a plane parallel to the planes in the two mirrors. The image light path travels first from the sheet to the first mirror (first with respect to the direction of travel of the sheet transport) and then into one camera, thereafter the same image light path travels from the sheet to the second mirror and then into the other camera. The objective lenses of the two cameras are facing each other and have their optical axes in different planes. The respective distances between the intersecting line of the two mirrors and the two cameras may be the same or may be unequal.

The aforedescribed microfilm flow type camera offers the following advantages:

In the known microfilm flow type cameras the three identical lenses have identical reduction factors, i.e. the reproductions on the microfilm are of equal size. Hence a change in the reduction factor for either one of the two films is not possible. The microfilm flow type camera of this invention, on the other hand, offers the important advantage in that the reduction factor for either camera may be varied. With such an arrangement it is, for example, possible to use the pictures of one film for further reproductions whereas the pictures of the other film are only used for control purposes.

The aforementioned as well as additional objects, features, and advantages of the present invention will become more clearly apparent from the following detailed description thereof which is to be read with reference to the accompanying drawings, in which.

Figure 1:
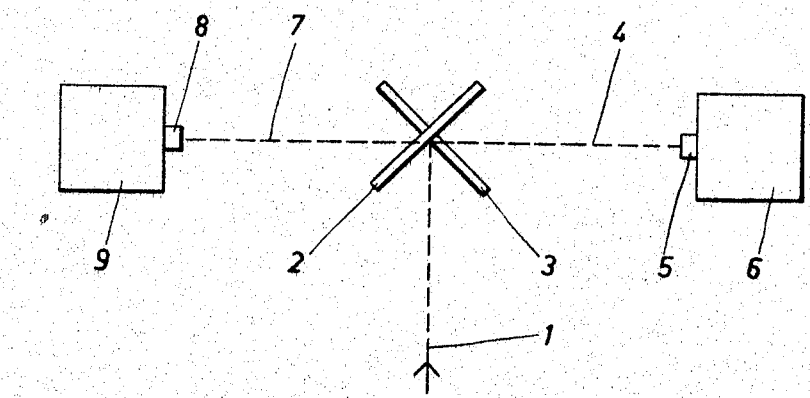
FIG. 1 shows diagrammatically a simplified side elevation of the device of this invention seen in the direction of movement of the sheet transport belt means.
Figure 2:
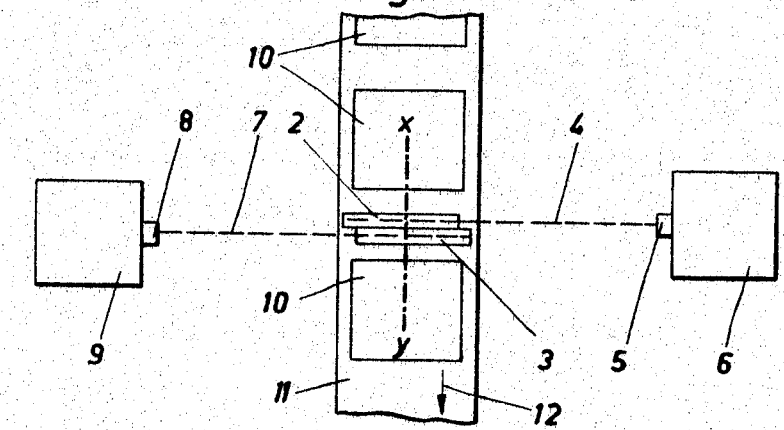
FIG. 2 is a diagrammatic simplified top view of the device illustrated in FIG. 1.

Referring now to the drawings, there is illustrated a plurality of sheets 10 which are placed on top of a transport belt 11 and are moved through the camera by the latter in a direction illustrated by the arrow 12 in FIG. 2. A light beam 1 which emanates or is reflected from an illuminated sheet 10 is reflected by a first surface silver-coated mirror 2 (first with respect to the movement of the belt 11) into the objective lens 5 of a microfilm camera 6. The same light beam 1 will be reflected by a second surface silver-coated mirror 3 into the objective lens 8 of another microfilm camera 9.

The light beam 1 emanating from a sheet 10 moving in the direction of the arrow 12 is first reflected by the mirror 2 as light beam 4 which is directed into the objective lens 5 of the camera 6. After the sheet 10 has been moved a small distance further in the direction of arrow 12, the light beam 1 no longer impinges on mirror 2 but now impinges on mirror 3 which is arranged at an angle of 90° with respect to mirror 2. Mirror 3 reflects the light beam 1 as light beam 7 into the objective lens 8 of the camera 9. In this manner, the almost simultaneous taking of two microphotographs of one sheet 10 is accomplished.

The microfilm cameras 6 and 9 may be spaced at equal distances from their respective mirrors 2 and 3. Alternately, the cameras 6 and 9 may be spaced at different distances from the mirrors 2 and 3. For example, when different reduction factors for the two cameras is desired. It should also be noted that the microfilm cameras are self-contained units that can be easily replaced.

In further explanation of the invention there is given an illustrated description of the device:

There are two self-contained removable microfilm cameras in the microfilm flow type apparatus. Camera B remains in the apparatus and is only removed for maintenance purposes. Camera A, which for example belongs to a particular department of an organization, is only inserted into the apparatus when this department wishes to reproduce some material on microfilm. Another department of the same organization may similarly use another microfilm A1 and a third department may similarly use a microfilm camera A2 and so forth. Each department of the organization inserts its own self-contained microfilm camera into the apparatus and removes it after use.

The microfilm camera unit B, on the other hand, remains in the apparatus and takes consecutively all pictures taken with cameras A, A1, A2, etc. on its microfilm reel. It should also be noted that the microfilm photographs on the microfilm of camera B may be smaller by using a larger reduction factor lens arrangement than those of cameras A, A1, A2, etc., particularly when camera B is only used for control purposes. This procedure results in substantial savings of microfilm.

The reduction factor for a microfilm camera can be adjusted in a known manner by either adjusting the distance between the camera and the reflecting mirror or by exchanging the objective lens of the camera itself.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. An apparatus for making photographic reproductions of sheets of material introduced therein, comprising in combination, sheet transport means for operatively moving said sheets of material through said apparatus, illuminating means operatively mounted in said apparatus for illuminating said sheets of material, first and second microfilm cameras respectively mounted on opposite sides of said apparatus, each of said two microfilm cameras including microfilm mounting means for respectively moving microfilms through said first and second microfilm cameras at synchronous but reduced speeds with respect to the rate of movement of said sheets of material, first and second light reflecting means mounted in said apparatus at an angle of 90° with respect to each other, said first and second light reflecting means are arranged in said apparatus so as to respectively direct light images emanating from said sheets of material first into said first microfilm camera and then into said second microfilm camera.

2. The apparatus for making photographic reproductions of sheets of material introduced therein as set forth in claim 1, including first and second optical reduction means respectively operatively mounted in said first and second cameras for reducing and directing light images onto said microfilms.

3. The apparatus for making photographic reproductions of sheets of material introduced therein as set forth in claim 1, wherein said first and second microfilm cameras are mounted in said apparatus so as to be respectively differently spaced from said first and second light reflecting means.

4. The apparatus for making photographic reproductions of sheets of material introduced therein as set forth in claim 2, wherein said first and second microfilm cameras are respectively equidistant from said first and second light reflecting means, and wherein said first and second optical reduction means reduce to different scales the images passing respectively therethrough.

5. The apparatus as set forth in claim 1, wherein the respective distances between said first and second light reflecting means and said first and second microfilm cameras are unequal.

References Cited by the Examiner
UNITED STATES PATENTS 2,600,489   6/1952   D'Avitaya _____ 88—24
2,727,429   12/1955   Jenkins.

NORTON ANSHER, *Primary Examiner.*

R. A. WINTERCORN, *Assistant Examiner.*